United States Patent [19]

Sieren

[11] 3,822,073
[45] July 2, 1974

[54] FRONT END WEIGHT CARRIER
[75] Inventor: Gerald E. Sieren, Greendale, Wis.
[73] Assignee: Allis-Chalmers Corporation, Milwaukee, Wis.
[22] Filed: Nov. 2, 1972
[21] Appl. No.: 303,282

[52] U.S. Cl. ............................................. 280/150 E
[51] Int. Cl. ............................................. B60r 27/00
[58] Field of Search.......... 280/150 E; 248/226, 227

[56] References Cited
UNITED STATES PATENTS
3,635,493  1/1972  Barth.............................. 280/150 E
3,700,256  10/1972  Jones............................. 280/150 E
3,709,520  1/1973  Johnson........................ 280/150 E

*Primary Examiner*—Robert R. Song
*Attorney, Agent, or Firm*—Arthur L. Nelson

[57]  ABSTRACT

A front end weight carrier for supporting a plurality of front end weights to provide traction and stabilization for steering on the front end of the vehicle.

9 Claims, 5 Drawing Figures

PATENTED JUL 2 1974 3,822,073
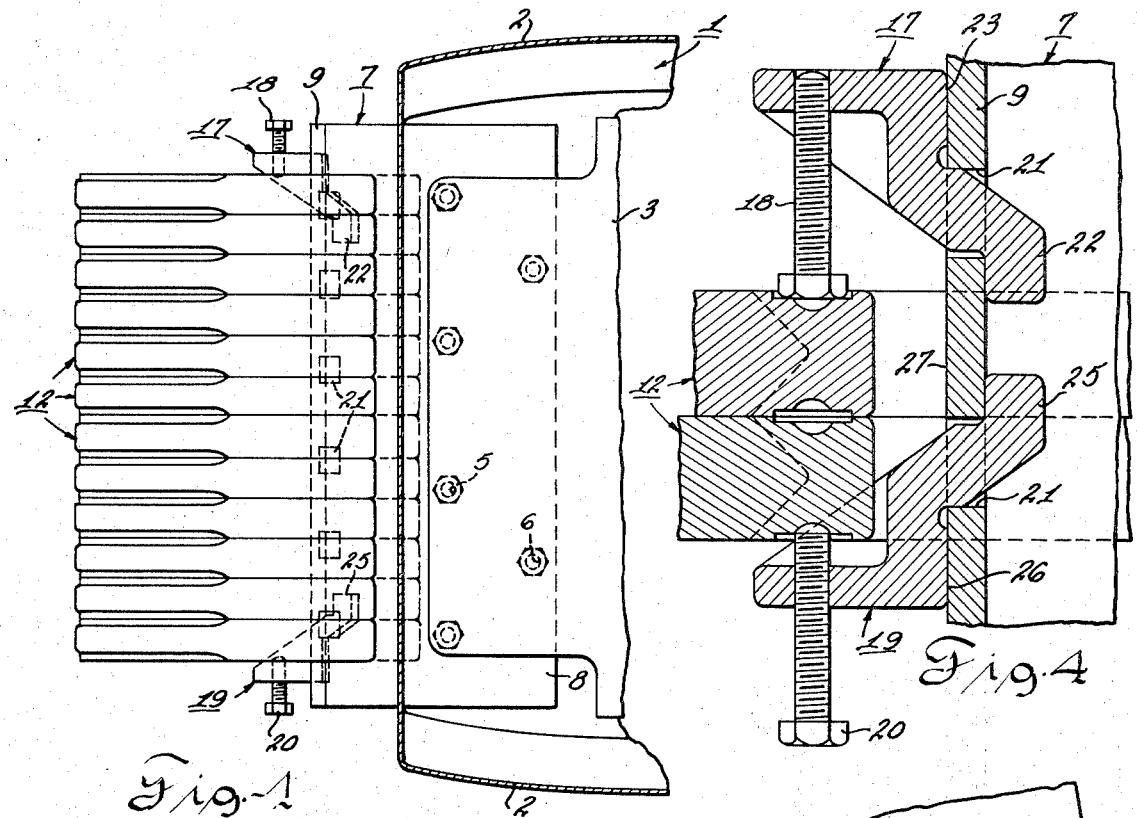
Fig. 1
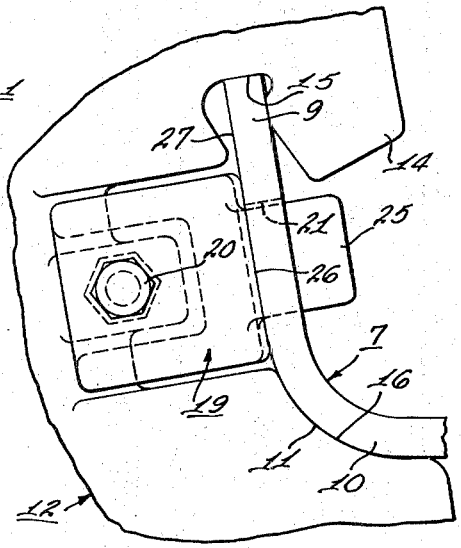
Fig. 4
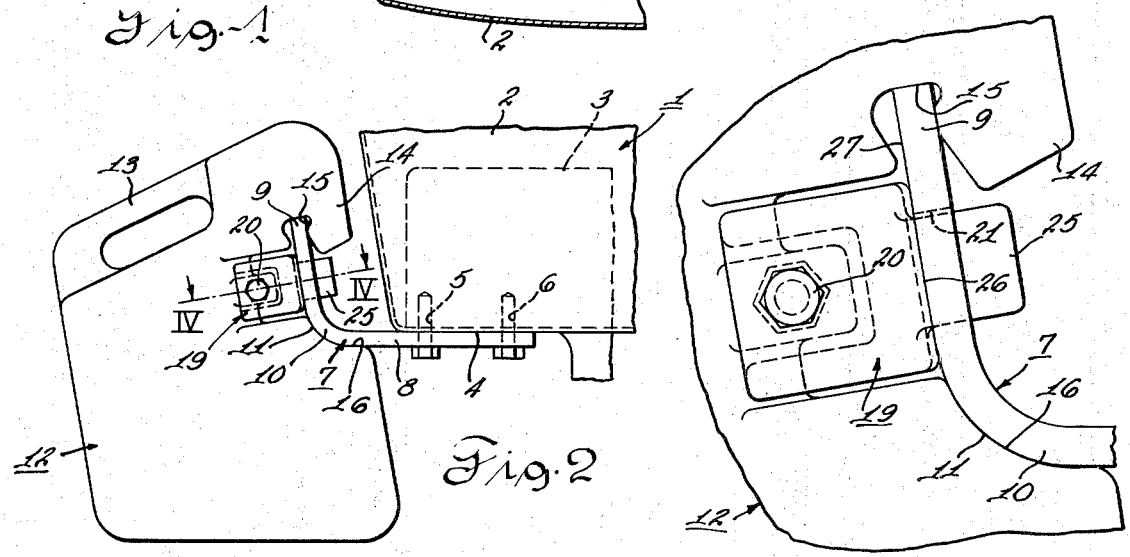
Fig. 2
Fig. 5
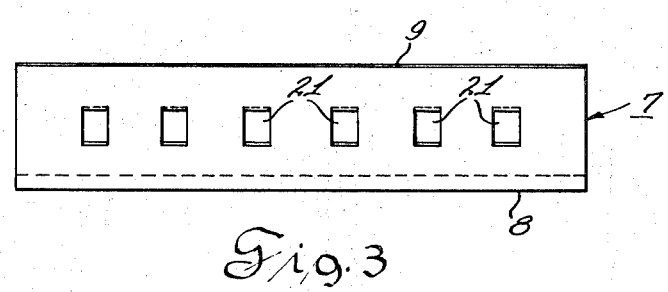
Fig. 3

FRONT END WEIGHT CARRIER

This invention relates to a means for providing weight on the front end of the vehicle and more particularly to a front end carrier for mounting on the underside of the chassis of the vehicle and permitting mounting and removal of the plurality of weights from the front or either side of the carrier of the vehicle.

In order to gain maximum efficiency from the tractor in operating earthworking implements, it is usually necessary to provide some form of ballast for weighting down the tractor. Without the additional weight on the tractor, the tractive wheels usually will slip and with the loss of traction the power of the engine is not available for use in operating the implements. Accordingly, most tractors employ wheel weights on the rear wheels and in some cases use a liquid in the tires of the rear wheels to provide added weight to assure traction of the tractor at all times.

On the tractor employing a weight distribution system, the weight of the vehicle is shifted to the rear wheels when an increase in draft load is encountered by the rear wheels. This is usually done through a hydraulic weight distribution in response to the sensed draft load. The transfer of weight can present a problem since the front wheels must also retain sufficient traction to provide steering and maintain stability in controlling the tractor. Accordingly, the addition of weight on the front end of the vehicle is often necessary. The amount of weight required varies with the type of operation performed by the tractor. It is desirable to have a means for selectively adding or removing weight from the front end of the vehicle. Accordingly, this invention provides a means for attaching a weight carrier on the forward end of the vehicle. The weight carrier is constructed in such a manner that one or more weights can be mounted on the carrier from either side or from the forward position on the vehicle and the weights then can be securely fastened to prevent rattling or any movement or shifting while the vehicle is in operation.

It is an object of this invention to provide a front end weight carrier on the vehicle.

It is another object of this invention to provide a front end weight carrier mounted on the underside of the chassis which permits use of side panels to extend over the side of the chassis.

It is a further object of this invention to provide a front end weight carrier having a single cross bar extending across the front end of the vehicle and connected only at its lower edge to permit removal and addition of weights from either side or the front of the vehicle. front end The objects of this invention are accomplished by using a single plate having a horizontal mounting flange bolted on the underside of the chassis and extending for the width of the front end of the vehicle. The plate is formed with a bend adjoining the support flange with a substantially vertical flange which carries a plurality of front end weights. The vertical flange has a plurality of holes across the length of the plate with each hole for reception of a bracket to fasten weights on the carrier. Each bracket locks in a hole and has a bolt which is screwed to engage a lateral surface on a weight holding one or more weights on the fron tend of the carrier to prevent them from rattling or shifting during operation of the vehicle.

The preferred embodiment of this invention will be illustrated in the attached drawings.

FIG. 1 illustrates a plan view of the carrier mounted on the vehicle supporting a plurality of weights.

FIG. 2 is a side elevation view of the carrier mounted on the vehicle supporting a plurality of weights.

FIG. 3 is a view from the front of the vehicle showing the carrier per se.

FIG. 4 is an enlarged cross section view taken on line IV—IV on FIG. 2.

FIG. 5 is an enlarged fragmentary side view of the weight mounted by means of a bracket on the carrier.

FIG. 1 shows a front end of the vehicle chassis 1. The chassis includes the side panels 2 and, the casting 3. The casting 3 forms an undersurface 4 with a plurality of threaded openings 5 and 6 as shown.

FIG. 1 shows a plurality of bolts each received in the threaded openings for supporting the carrier for fastening the supporting flange 8 of the carrier 7. The carrier 7 is also formed with the weight carrying flange forming a bar 9. The weight carrying bar 9 and the supporting flange 8 are joined by the intermediate curved portion 10. The curved potion 10 forms a seat 11 upon which the weights 12 rest when positioned on the carrier.

Each weight 12 is formed with a handle 13 for manually lifting the weight and a hook 14 for hanging over the bar 9 of the carrier 7. The hook 14 on the weight 12 forms a slot 15 which receives the bar 9. As the weight hangs down over the bar 9 the abutting surface 16 on the weight 12 rests against the seat 11 of the carrier 7. Since the center of gravity of the weight is forward of the bar 9 when the weight is hung on the bar the weights tend to rotate counterclockwise and rest firmly on the seat 11.

FIG. 1 shows a full complement of weights 12 mounted on the carrier. The right hand bracket 17 is mounted on the bar 9 and a bolt 18 threadedly engages the bracket 17 to provide a compressive force against the right hand weight as shown. The left hand bracket 19 is mounted on the left hand side of the left hand weight 12 and similarly carries a bolt 20 which engages the left hand side of the left hand weight to firmly lock the weights in position.

FIG. 4 more clearly shows the mounting of brackets 17 and 19 of the bar 9. The bar 9 is shown in FIG. 3 with a plurality of holes 21. FIG. 4 shows the holes 21 with brackets mounted and extending into the holes. The bracket 17 has a lug 22 received within the hole 21. The base 23 of the bracket 17 is pressed against the facing on the bar 9 as the bolt 18 is tightened against the weight 12. Similarly, the bracket 19 is mounted with a lug 25 received in a hole 21. The base 26 seats firmly on the facing 27 of the bar 9. The screw 20 is threadedly received in the bracket 19 and presses firmly against the weight 12 on the left hand side. This action of the screws 18 and 20 lock the weights 12 between the brackets 17 and 19 to prevent them from movement once they are in the operating position as shown. The brackets shown in FIG. 4 carry a screw positioned from either side to show that one or more weights can be mounted on the carrier. With both bolts on the inside of the brackets and having their head each engaging a weight 12 permits the mounting of a single weight on the carrier. By reversing the position of a bolt with the same location of the brackets 17 and 19, three weights 12 might be positioned on the hanger.

Accordingly the carrier comprises a plate having a carrier supporting portion 8 which extends underneath the chassis for mounting on the underside of the chassis by means of a plurality of bolts. A curve intermediate portion 10 joins the mounting portion 8 with the carrier bar 9. Carrier bar 9 extends transversely forwardly of the tractor to support the plurality of weights 12. The weights 12 can be mounted on the bar from either side or from the front of the tractor with ease. Once the weights are hung on the bar 9 the brackets 17 and 19 are positioned on either side and the bolts 18 or 20 are then tightened to compressively position the weights on the carrier 7. The weights 12 hang downwardly and rotate counterclockwise to firmly seat against the seat 11 on the curved surface of the carrier 7. With the brackets firmly pressing the weights together the weights are retained in position and prevented from rattling or lifting off hanger bar 9 when the vehicle is in operation.

The embodiments of the invention in which an exclusive property or privilege is claimed are defined as follows:

1. A front end weight carrier assembly comprising, a front end of a vehicle chassis defining an undersurface, a carrier defining a substantially vertical bar extending transversely across the front of said vehicle chassis with said bar extending upwardly in spaced relation from the front of said chassis, a generally horizontal supporting plate, an intermediate adjoining section integrally connecting to the lower edge of said bar and to said plate and defining a curved seating surface, fastening means connecting said plate to the undersurface of the front of said vehicle chassis, means defining a plurality of holes across the length of said bar, at least one weight defining a hook hanging on said bar and defining a mating surface resting against said seating surface, bracket means on each side of said weight each having a portion extending into one of said holes in said bar, fastening means on each of said bracket means each compressively engaging a weight transversely for compressively retaining said weight on said carrier when said fastening means is tightened to thereby retain said weight on said carrier.

2. A front end weight carrier assembly as set forth in claim 1 wherein said front end of the vehicle chassis defines a substantially horizontal undersurface for mounting said carrier.

3. A front end weight carrier assembly as set forth in claim 1 wherein said bar, said plate, and said adjoining section all define an integral member of substantially uniform thickness.

4. A front end weight carrier assembly as set forth in claim 1 wherein said carrier defines a rectangular-shaped member curved at its adjoining section.

5. A front end weight carrier assembly as set forth in claim 1 wherein said carrier defines a plurality of bolt holes in said plate for fastening said carrier to the undersurface of said vehicle chassis.

6. A front end weight carrier assembly as set forth in claim 1 wherein said plurality of holes in said bar define a horizontal linear relationship.

7. A front end weight carrier assembly as set forth in claim 1 wherein said bar defines a horizontal upper surface and vertical side surfaces.

8. A front end weight carrier assembly as set forth in claim 1 wherein said curved seating surface defines an arcuate seating surface by the adjoining section connecting said bar with said plate for engaging said weight, said weight defining a mating surface resting against said arcuate seating surface.

9. A front end weight carrier assembly as set forth in claim 1 wherein said weight defines said hook on the rearward side of said weight, means defining a substantial portion of weight forwardly of said hook causing said hook to rotate about the pivot of the engagement of said hook with said bar, said weight thereby firmly pressing against said carrier when mounted on said carrier.

* * * * *